Nov. 19, 1963 SABURO SHOJI 3,111,562

AUTOMATIC TELEPHONE CALLING SYSTEM UTILIZING PUNCHED CARDS

Filed Nov. 20, 1959 2 Sheets-Sheet 1

INVENTOR

Saburo Shoji

BY Leon M. Strauss

ATT.

AUTOMATIC TELEPHONE CALLING SYSTEM UTILIZING PUNCHED CARDS

Filed Nov. 20, 1959 2 Sheets-Sheet 2

INVENTOR

Saburo Shoji

BY Leon M. Strauss
AGT.

United States Patent Office 3,111,562

Patented Nov. 19, 1963

3,111,562

AUTOMATIC TELEPHONE CALLING SYSTEM UTILIZING PUNCHED CARDS

Saburo Shoji, Tokyo-to, Japan, assignor to Kanda Tsushin Kogyo Kabushiki Kaisha, Tokyo-to, Japan Filed Nov. 20, 1959, Ser. No. 854,365
Claims priority, application Japan Apr. 7, 1959
3 Claims. (Cl. 179—90)

The invention relates to an automatic telephone calling system, wherein a plurality of frequently called telephone numbers are stored in its memory section and when it is desired to call any selected one of said stored telephone numbers the desired calling is automatically carried into effect by manipulating suitable means corresponding to the telephone number to be called.

A main object of this invention is to provide a novel automatic telephone calling system, wherein a plurality of punched cards are employed for storing frequently called telephone numbers in a coded manner.

Another object of the invention is to provide an improved automatic telephone calling system, wherein upon insertion of a punched card corresponding to the telephone number to be called in a decoder of the machine, the corresponding dialing pulses are automatically sent out through the line circuit.

In the automatic telephone calling system according to this invention, a number of frequently called telephone numbers are stored in corresponding number of punched cards in a coded manner. When it is desired to call any one of the stored telephone numbers the corresponding punched cards selected from stored group of cards is inserted in a decoding section of the system. A starting push button is depressed to actuate several working parts of the system, and, as a result, corresponding dialing pulses are automatically sent out through the related line circuit to the office switch board for the desired telephone being called.

The above and further objects and novel features of the present invention will more fully appear from the following detailed description, when the same is read in connection with accompanying drawings. It is to be expressly understood, however, that the drawings are for the purpose of illustration only and are not intended as a definition of the limits of the invention.

In the drawings, wherein like reference characters refer to like parts throughout the several views, FIG. 1 represents an explanatory representation for illustration of the telephone number coding system employing punched cards as a telephone number storage medium;

Figure 1:
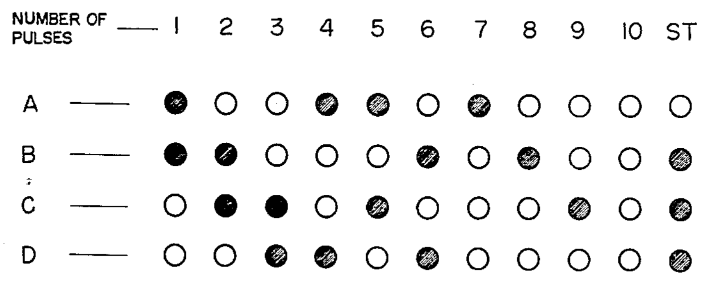

Referring now to FIGURE 1, the principle of telephone number storage and coding system employing punched cards will be described in detail:

In FIG. 1, there are shown four horizontal rows of punching positions. Each of these rows designated by A, B, C, and D, respectively, has eleven sequentially-arranged positions wherein shaded small circles represent punched positions and non-shaded small circles represent non-punched positions, respectively. A series of successive numerical numbers shown in the uppermost line in FIG. 1 denote numbers of pulses corresponding to dialing pulses for calling a telephone number by manipulating a calling dial on a subscriber's telephone set. In this example, digit 1 is represented by a combination of two punched positions in the rows A and B. In the similar way, 2 and 3 are represented by two punched positions in rows B and C, and C and D, respectively, and so on. As is clearly shown in FIGURE 1, a series of digits 1 through 10 can be effectively coded in this manner. A combination of three punched holes B, C and D represents a transmission terminating symbol in telephone communication, which is denoted by a combined reference character ST in FIG. 1.

Figure 2:
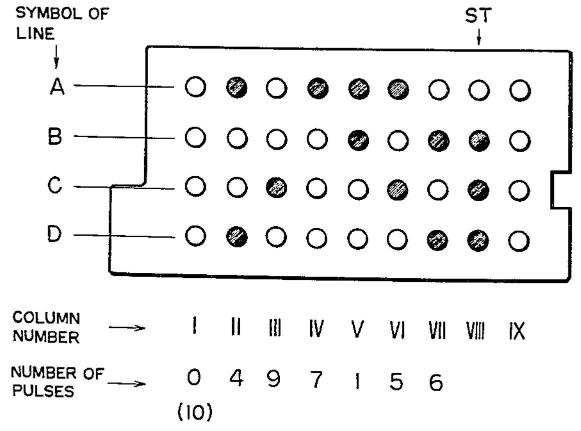
FIG. 2 is a diagrammatic representation of a sample punched card which stores the telephone number "0497156"

In one embodiment shown in FIG. 2, of a telephone number encoded punched card prepared according to the above principle, there is included, as explained in connection with FIG. 1, four horizontal rows of punching positions. Each of these rows, designated as rows A, B, C and D, respectively, comprise nine successive positions. In this card as shown, punched positions are represented as in FIG. 1 by shaded small circles and non-punched positions are represented by non-shaded circles. In this card, the first digit of a telephone number is represented by punched hole or holes in the first column designated as column I; the second digit thereof by the second column II; and so on. The last column IX represents a transmission terminating symbol designated in FIG. 2 by ST. Therefore, the card shown in FIG. 2 is encoded to store the telephone number "0497156."

Figure 3:
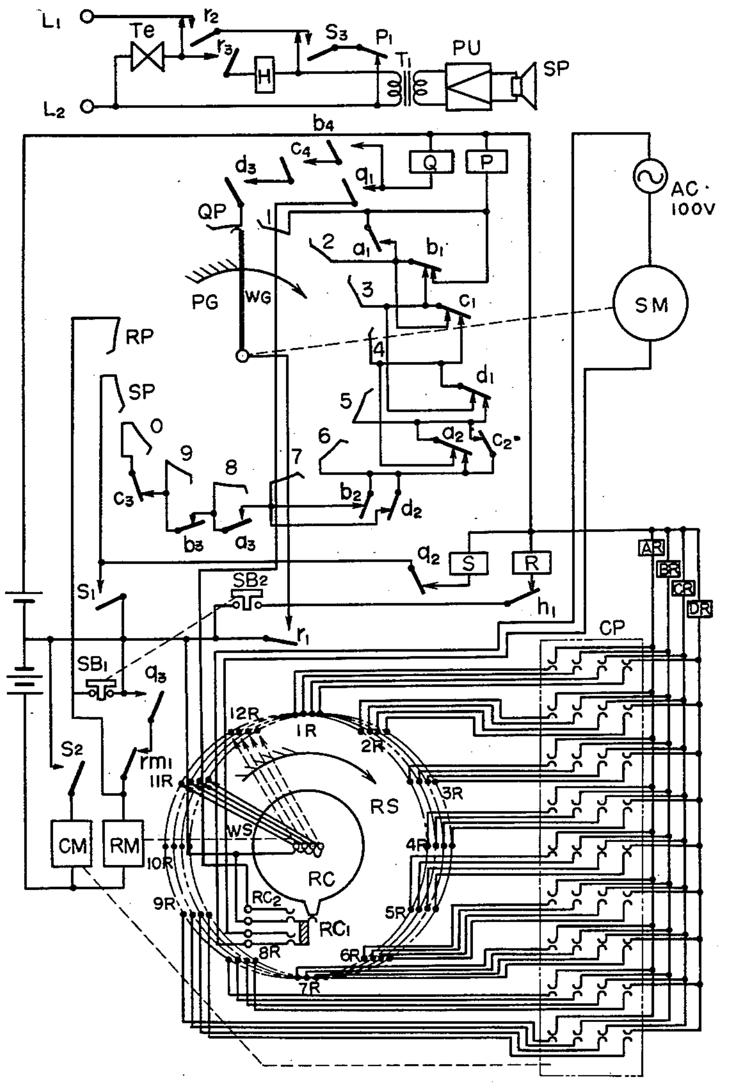
FIG. 3 shows by way of example, a schematic representation of the circuitry in the system according to an illustrative embodiment of the invention.

Next, referring to FIG. 3, the circuitry embodying, by way of example, the automatic telephone calling system employing punched cards according to this invention is described in detail hereinafter:

In FIG. 3, CP represents a plurality of groups of contacts of a decorder; CM represents an actuating electromagnet; RS represents a rotary switch; WS represents a wiper of the rotary switch RS; 1R, 2R . . . 12R are a group of contacts adapted to cooperate with the wiper WS; RC is a plate cam directly coupled with said wiper WS; RM is a driving magnet adapted to drive the rotary switch RS; PG is a rotary pulse generator; WG is a wiper of pulse generator PG; 1, 2, 3 . . . 9, O, SP, RP and QP are a group of stationary contacts adapted to cooperate with the wiper WG; SM is a synchronous motor for driving the pulse generator PG; AR, BR, CR and DR are decoder relays; H, P, Q, R and S are a group of actuating relays; T*e* is an automatic telephone set for a subscriber; $L_1$ and $L_2$ are line terminals leading to an office switch board (not shown); SP is a loud speaker; PU is an amplifier for the loud speaker SP; $SB_1$ and $SB_2$ are starting push buttons directly coupled mechanically with each other for operation in unison.

Initially, a card made from an electrical insulating material and punched with a plurality of holes (as shown and described in connection with FIG. 2) is inserted into a gap or space between two groups of cooperating contacts CP of the decorder. Although for simplification of FIG. 3, these two groups of cooperating contacts are shown in vertically arranged stages, they are, in practice, arranged one above the other. When push buttons $SB_1$ and $SB_2$ are depressed (i.e., closed), the relay R is energized by current, which flows through the closed switch $SB_2$ and a normally closed contact $h_1$, the relay R being thereafter self-held by the closure of its sealing contact $r_1$. Due to the energization of the relay R, the relay contacts $r_2$ and $r_3$ are caused to transfer to their associated contact points. Thereby the circuit of the telephone set T*e*, which was theretofore directly connected to the line circuit through terminals $L_1$ and $L_2$, the relay H is now connected and a parallel circuit including a transformer $T_1$ is connected in parallel with the normal telephone circuit.

Also, by the closure of contact $SB_1$, the rotary magnet RM is energized, thus advancing the wiper WS one step to make contact with the stationary contacts 12R (as shown by dotted lines in FIG. 3). At the same time, the plate cam RC is rotated in the clockwise direction (as indicated in FIG. 3 by an arrow). As a result, the contacts $RC_1$ and $RC_2$ close to start rotation of the synchronous motor M, which rotates the wiper WG of the pulse generator PG. Each time the wiper WG contacts one of stationary contacts 1–0, the relay P becomes actuated and then is restored to a non-actuated condition. The pulse delivery contact $P_1$ of the relay P will, however, not operate in this case, on account of the open condition of the contact $S_3$. When the wiper WG passes first over contact SP, a circuit for relay S is completed to actuate relay S and thereafter relay S is kept energized by its closed sealing contact $S_1$. By actuation of relay S, its associated contact $S_3$ is actuated to connect a circuit including contact $p_1$ to the line circuit through terminals $L_1$ and $L_2$. Thus, the whole arrangement is ready for transmitting pulses to the office. Also, at the same time, the contact $S_2$ is closed to energize the driving magnet CM whereby a selected group of the contacts CP determined by the punched holes in the inserted card or memory element are forced into contact with the cooperating stationary contacts.

When the wiper WG passes over stationary contact RP, the driving magnet RM is actuated thereby and thus wiper WS is stepped over to the next contact 1R.

As assumed hereinbefore, the card is provided with a number of punched holes as illustrated in FIG. 2, wherein the first vertical column has none of the positions punched, so that circuits including relays AR, BR, CR and DR will not be established. Thus, their related contacts are kept in their original conditions as illustrated in FIG. 3. Each time the wiper WG passes over one of contacts 1–0, the relay P is momentarily actuated, thus resulting in the contact $p_1$ making and breaking a total of ten times thereby causing ten pulses to be sent out to the office switch board through the line circuit. The transmission rate, or frequency of these pulses is preferably selected to be 10 cycles per second so that the distance between each set of adjoining contacts is one fifteenth of a complete revolution and the time period for a complete revolution of the synchronous motor SM amounts to 1.5 seconds. As will be clear to one skilled in the art, the above-mentioned pulses are preferably of rectangular wave shape, the make ratio of which can easily and effectively be determined by adopting suitable sizes of each of said contacts, proper width of the wiper and suitable adjustment of operating performance of relay P.

When the wiper WG passes over contact RP, the wiper WS of the rotary switch RS is further driven one step to make contact with contact 2R, thus circuits including both relays AR and DR will be completed through punched holes belonging to the second column II of the card and thereby these two relays AR and DR are actuated. By this operation, contacts $d_1$ and $a_3$ are transferred to their break or open condition while contacts 1, 2, 3 and 4 are connected to relay P, but those contacts having reference numerals 5 and higher numbers are disconnected therefrom. With rotation of wiper WG, relay P is thus driven four times, so that four pulses will be sent out for the second digit of the selected telephone number stored in the card.

Having passed over the contact RP, the wiper WS will then make contact with a stationary contact 3R, so that a circuit including relay CR for the third digit is thereby completed to actuate the relay. By the breaking operation of contact $C_3$, contacts 1–9 are connected to relay P, while contact 10 is disconnected therefrom. Thus, in this case, 9 pulses will be sent out.

In the similar way, 7, 1, 5 and 6 pulses will be successively sent out and then wiper WS of rotary switch RS is brought into contact with stationary contact 8R, while relays BR, CR and DR are actuated through the intermediary of the eighth column on the card having punched positions in lines B, C and D, thus closing contacts $d_3$, $c_4$ and $b_4$. When the wiper WG passes over contact QP, a circuit for relay Q is completed through the closed contacts $d_3$, $c_4$ and $b_4$, and the relay is maintained energized by the closed contact $q_1$.

The actuation of relay Q causes contact $q_2$ to break and relay S is thereby restored to restore its contact $s_3$. The restoration of the last mentioned contact $s_3$ interrupts the pulsing contact circuits and telephone set T*e* and transformer $T_1$ are connected to the line circuit including terminals $L_1$ and $L_2$.

By the transmission of the above-mentioned groups of pulses, the automatic office switch board is connected to the called subscriber's telephone set corresponding to the selected telephone number, so that a ringing tone, busy tone or response by the called subscriber, as the case may be, is audible through the loud speaker SP. When the calling subscriber takes up the handset of the telephone set T*e* in response thereto, relay H is thereby actuated, which causes contact $h_1$ to break in order to restore relay R. The de-energization of relay R causes its contacts $r_2$ and $r_3$ to restore to their disconnected positions. Thus telephone set T*e* is connected to the line circuit.

On the other hand, the restoration of relay S causes its contact $s_2$ to break, thereby magnet CM is restored (de-energized) and the card inserted in the machine is released from its pressure engagement. The aforementioned actuation causes the contact $q_3$ to close thereby actuating magnet RM. The magnet RM by the action of auto-interrupting contact $rm_1$ continues to make its stepwise movement, until plate cam RC pushes up contacts $RC_1$ and $RC_2$ to cause them to open. At this time, the circuit including relay Q is interrupted and the relay Q is thereby de-energized, resulting in its contact $q_3$ opening to de-energize the magnet RM. The synchronous motor SM is also de-energized by the broken contact $RC_1$.

Should the calling subscriber desire to call a different telephone number from those stored in the machine, he may manipulate as desired his dial on his telephone set as in the usual manner and complete the call in the conventional manner.

It will be appreciated from the foregoing, that with use of the present system a number of frequently called telephone numbers are stored in a corresponding number of punched cards and by selecting any desired one out of them for insertion in the machine and by depressing the starting push button after insertion of the thus selected card, the desired telephone set is contacted in an automatic manner.

Although certain particular embodiments of the invention are herein disclosed for purpose of explanation, various further modifications thereof, after study of this specification, will be apparent to those skilled in the art to which the invention pertains. Reference should accordingly be had to the appended claims in determining the scope of the invention.

What is claimed as new and desired to be secured by Letters Patent is:

1. An automatic telephone calling system employing punched cards for dialing, said system comprising, in combination, a card of dielectric material having a preselected number of punch locations arranged at the intersections of columns and rows, the number of rows being at least equal to the number of digits in the telephone number to be dialed; each determinate digit being represented by at least one punched opening at a punch location and the value of any digit being determined by the number and column location of the punched openings in its respective row; a contact bank including a number of pairs of first and second card contacts equal to said preselected number and disposed at column and row intersections corresponding spatially to the said punch locations; said card being insertable in aligned relation in said contact banks between the first and second contacts of all of said pairs so that only those pairs of contacts at each punched opening will be effective to become engaged; means manually operable to bias the contacts of each pair toward engagement; a stepping switch having a wiper and sets of wiper contacts corresponding to the number of said rows, the first card contacts of all of the pairs in a respective row being connected to a respective set of wiper contacts, said stepping switch being operable to successively scan the punch locations of said card to detect the presence of card contacts thereat; a pulse generator operable, when energized, continuously to generate repetitive and successive groups of spaced pulses at a constant rate; means associated with said pulse generator and said stepping switch to step said stepping switch by a particular pulse in each group so that said stepping switch will be operated successively scan the rows of card contacts with each pulse group being generated during the time said stepping switch is at a respective position; a pulse delivery switch; pulse responsive means operable, responsive to each receipt of a pulse of said generator, to operate said pulse delivery switch; a decoder means connected to the second card contacts of all of said pairs and to a pulse transmitting circuit connected to said pulse responsive means, said decoder means being effective to provide for transmission to said pulse responsive means of a number of pulses of each group equal only to the numerical value of the digit represented by the punched openings in the card row then being scanned by said stepping switch; and means operable to reset said pulse generator, said decoder means, and said stepping switch to their original positions upon completion of the sending out of all of the digit pulse groups corresponding to the called telephone number.

2. An automatic telephone calling system, as claimed in claim 1, in which said stepping switch is a rotary switch.

3. An automatic telephone calling system, as claimed in claim 1, including means by signalling a completed connection with the telephone dialing system.

References Cited in the file of this patent

UNITED STATES PATENTS

| | | |
|---|---|---|
| 2,095,298 | Tauschek | Oct. 12, 1937 |
| 2,579,983 | Thornton | Dec. 25, 1951 |
| 2,813,931 | De Forest | Nov. 19, 1957 |
| 2,966,557 | Schmitt | Dec. 27, 1960 |